US012316688B2

(12) United States Patent
Lugiai et al.

(10) Patent No.: US 12,316,688 B2
(45) Date of Patent: *May 27, 2025

(54) SYSTEMS AND METHODS TO ESTABLISH SERVICE REQUEST INTERACTIONS

(71) Applicant: Softphone SRL, Milan (IT)

(72) Inventors: Alan Lugiai, Brembate di Sopra (IT); Francesco Falanga, Mercogliano (IT); Bartolomeo Sorrentino, Milan (IT)

(73) Assignee: Softphone SRL (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/602,611

(22) Filed: Mar. 12, 2024

(65) Prior Publication Data

US 2024/0267418 A1 Aug. 8, 2024

Related U.S. Application Data

(63) Continuation of application No. 17/898,598, filed on Aug. 30, 2022, now Pat. No. 11,991,219, which is a (Continued)

(51) Int. Cl.
*G06F 15/177* (2006.01)
*H04L 12/06* (2006.01)
(Continued)

(52) U.S. Cl.
CPC .......... *H04L 65/1069* (2013.01); *H04L 12/06* (2013.01); *H04L 41/06* (2013.01); *H04L 67/02* (2013.01); *H04L 67/141* (2013.01)

(58) Field of Classification Search
None
See application file for complete search history.

(56) References Cited

U.S. PATENT DOCUMENTS 7,409,451 B1 * 8/2008 Meenan .............. H04L 43/0811 709/227
8,204,056 B2 * 6/2012 Dong .................. H04L 65/1083 379/265.06

(Continued)

OTHER PUBLICATIONS

Extended European Search Report for EP Appl. No. 23166141.4, dated May 2, 2023 (8 pages).

(Continued)

*Primary Examiner* — Phuoc H Nguyen
(74) *Attorney, Agent, or Firm* — Foley & Lardner LLP

(57) ABSTRACT

Systems and methods of establishing service requests via a smart TV device are provided. A smart TV device can receive fault condition information. The smart TV device can establish a first communication session between the smart TV device and a server and can transmit a service request interaction, including the received fault condition information, to the server. The server can transmit the first service request interaction to a computing device in a contact center environment. The computing device can generate diagnostic information and can transmit the diagnostic information to the server, which can forward the diagnostic information to the smart TV device. The smart TV device can display a prompt to deflect the first service request interaction from the smart TV device to a mobile device of the user. The mobile device can establish a second communication session between the mobile device and the computing device in the contact center environment to complete the first service request interaction.

22 Claims, 9 Drawing Sheets

400

Related U.S. Application Data continuation of application No. 16/971,920, filed as application No. PCT/IB2019/052357 on Mar. 22, 2019, now Pat. No. 11,470,125.

(60) Provisional application No. 62/663,548, filed on Apr. 27, 2018, provisional application No. 62/647,619, filed on Mar. 23, 2018.

(51) Int. Cl.

| | |
|---|---|
| ***H04L 41/06*** | (2022.01) |
| ***H04L 65/1069*** | (2022.01) |
| ***H04L 67/02*** | (2022.01) |
| ***H04L 67/141*** | (2022.01) |

(56) References Cited

U.S. PATENT DOCUMENTS

| | | | |
|---|---|---|---|
| 2003/0004680 A1 | 1/2003 | Dara-Abrams et al. | |
| 2004/0054771 A1 | 3/2004 | Roe et al. | |
| 2008/0183852 A1 | 7/2008 | Pramer et al. | |
| 2009/0034424 A1 * | 2/2009 | Chen | H04L 41/0853 726/21 |
| 2009/0083428 A1 * | 3/2009 | Meenan | H04L 43/0811 709/227 |
| 2011/0072312 A1 | 3/2011 | Fan et al. | |
| 2012/0321052 A1 * | 12/2012 | Morrill | H04L 67/10 379/32.01 |
| 2013/0013688 A1 | 1/2013 | Wang et al. | |
| 2014/0342709 A1 | 11/2014 | Stepanian | |
| 2014/0359018 A1 | 12/2014 | Sun | |
| 2015/0264091 A1 | 9/2015 | Lin et al. | |
| 2015/0371237 A1 | 12/2015 | Cooper | |
| 2016/0065410 A1 | 3/2016 | Brunet et al. | |
| 2016/0149970 A1 | 5/2016 | Jacquemot et al. | |
| 2017/0359232 A1 | 12/2017 | Stoops et al. | |
| 2017/0359421 A1 | 12/2017 | Stoops et al. | |
| 2018/0224822 A1 * | 8/2018 | Potucek | G05B 19/042 |
| 2019/0034309 A1 * | 1/2019 | Nayak | F24F 11/64 |
| 2021/0168582 A1 | 6/2021 | Ceccarelli et al. | |

OTHER PUBLICATIONS

Foreign Search Report on PCT PCT/IB2019/052357 dated Jul. 9, 2019.
International Preliminary Report on Patentability for application PCT/IB2019/052357 Dtd Sep. 29, 2020.
International Preliminary Report on Patentability for application PCT/IB2019/052357, dated Oct. 8, 2020.
Non-Final Office Action on U.S. Appl. No. 17/898,598 Dtd Jul. 27, 2023.
Notice of Allowance on U.S. Appl. No. 16/971,920 Dtd May 25, 2022.
Notice of Allowance on U.S. Appl. No. 17/898,598 Dtd Feb. 1, 2024.
US Final Office Action on U.S. Appl. No. 16/971,920 dated Feb. 25, 2022.

* cited by examiner

SYSTEMS AND METHODS TO ESTABLISH SERVICE REQUEST INTERACTIONS

CROSS-REFERENCE TO RELATED APPLICATIONS

This application claims the benefit of priority under 35 U.S.C. § 120 as a continuation of U.S. patent application Ser. No. 17/898,598, filed Aug. 30, 2022, which claims the benefit of priority under 35 U.S.C. § 120 as a continuation of U.S. patent application Ser. No. 16/971,920, filed Mar. 22, 2019, which claims the benefit of priority as a U.S. National Stage under 35 U.S.C. § 371 of International Patent Application No. PCT/IB2019/052357, filed on Mar. 22, 2019 and designating the United States, which application claims priority to U.S. Provisional Patent Application No. 62/647,619, titled "COMPUTING DEVICE DATA MESSAGE ALLOCATION" and filed on Mar. 23, 2018, and to U.S. Provisional Patent Application No. 62/663,548, titled "COMPUTING DEVICE DATA MESSAGE ALLOCATION" and filed on Apr. 27, 2018, each of which are incorporated herein by reference in their entirety.

BACKGROUND

A user can view content on smart TV devices or other media devices. For example, a user may access streamed video content via an application executing on a smart TV device. When a user experiences a problem with such an application, the user may wish to initiate a service request to attempt to fix the problem.

SUMMARY

One aspect of this disclosure is directed to a system to establish service request interactions. The system can include a data processing system having a registration component and an event handling component. The data processing system can execute a first connector application to receive, by the registration component, first registration information from a second connector application installed on a smart TV device. The registration component can receive second registration information from a third connector application installed on a computing device in a contact center environment. the registration component can establish a first communication session between the first connector application installed in memory of the data processing system and the second connector application installed on the smart TV device. The registration component can extend the first communication session from the first connector application installed in memory of the data processing system to the third connector application that installed on the computing device in the contact center environment. The event handling component can receive, from the second connector application installed on the smart TV device, a service request interaction via the first communication session. The event handling component can transmit the service request interaction to the third connector application installed on the computing device in the contact center environment via the first communication session. The event handling component can receive, from the computing device in the contact center environment, diagnostic information relating to the service request interaction. The event handling component can transmit the diagnostic information to the smart TV device to cause the smart TV device to display at least a portion of the diagnostic information via a smart TV service that executes on the smart TV device.

Another aspect of this disclosure is directed to a method of establishing service request interactions. The method can include receiving, by a data processing system having a registration component and an event handling component, first registration information from a second connector application installed on a smart TV device. The data processing system can execute a first connector application. The method can include receiving, by the registration component, second registration information from a third connector application installed on a computing device in a contact center environment. The method can include establishing, by the registration component, a first communication session between the first connector application installed in memory of the data processing system and the second connector application installed on the smart TV device. The method can include extending, by the registration component, the first communication session from the first connector application installed in memory of the data processing system to the third connector application that installed on the computing device in the contact center environment. The method can include receiving, by the event handling component from the second connector application installed on the smart TV device, a service request interaction via the first communication session. The method can include transmitting, by the event handling component, the service request interaction to the third connector application installed on the computing device in the contact center environment via the first communication session. The method can include receiving, by the event handling component from the computing device in the contact center environment, diagnostic information relating to the service request interaction. The method can include transmitting, by the event handling component, the diagnostic information to the smart TV device to cause the smart TV device to display at least a portion of the diagnostic information via a smart TV service that executes on the smart TV device.

Another aspect of this disclosure is directed to a computer-readable storage medium having instructions encoded thereon which, when executed by one or more processors of a data processing system, cause the one or more processors to perform a method of establishing service request interactions. The method can include receiving, by a data processing system having a registration component and an event handling component, first registration information from a second connector application installed on a smart TV device. The data processing system can execute a first connector application. The method can include receiving, by the registration component, second registration information from a third connector application installed on a computing device in a contact center environment. The method can include establishing, by the registration component, a first communication session between the first connector application installed in memory of the data processing system and the second connector application installed on the smart TV device. The method can include extending, by the registration component, the first communication session from the first connector application installed in memory of the data processing system to the third connector application that installed on the computing device in the contact center environment. The method can include receiving, by the event handling component from the second connector application installed on the smart TV device, a service request interaction via the first communication session. The method can include transmitting, by the event handling component, the service request interaction to the third connector application installed on the computing device in the contact center environment via the first communication session. The method can include receiving, by the event handling component from the computing device in the contact center environment, diagnostic information relating to the service request interaction. The method can include transmitting, by the event handling component, the diagnostic information to the smart TV device to cause the smart TV device to display at least a portion of the diagnostic information via a smart TV service that executes on the smart TV device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
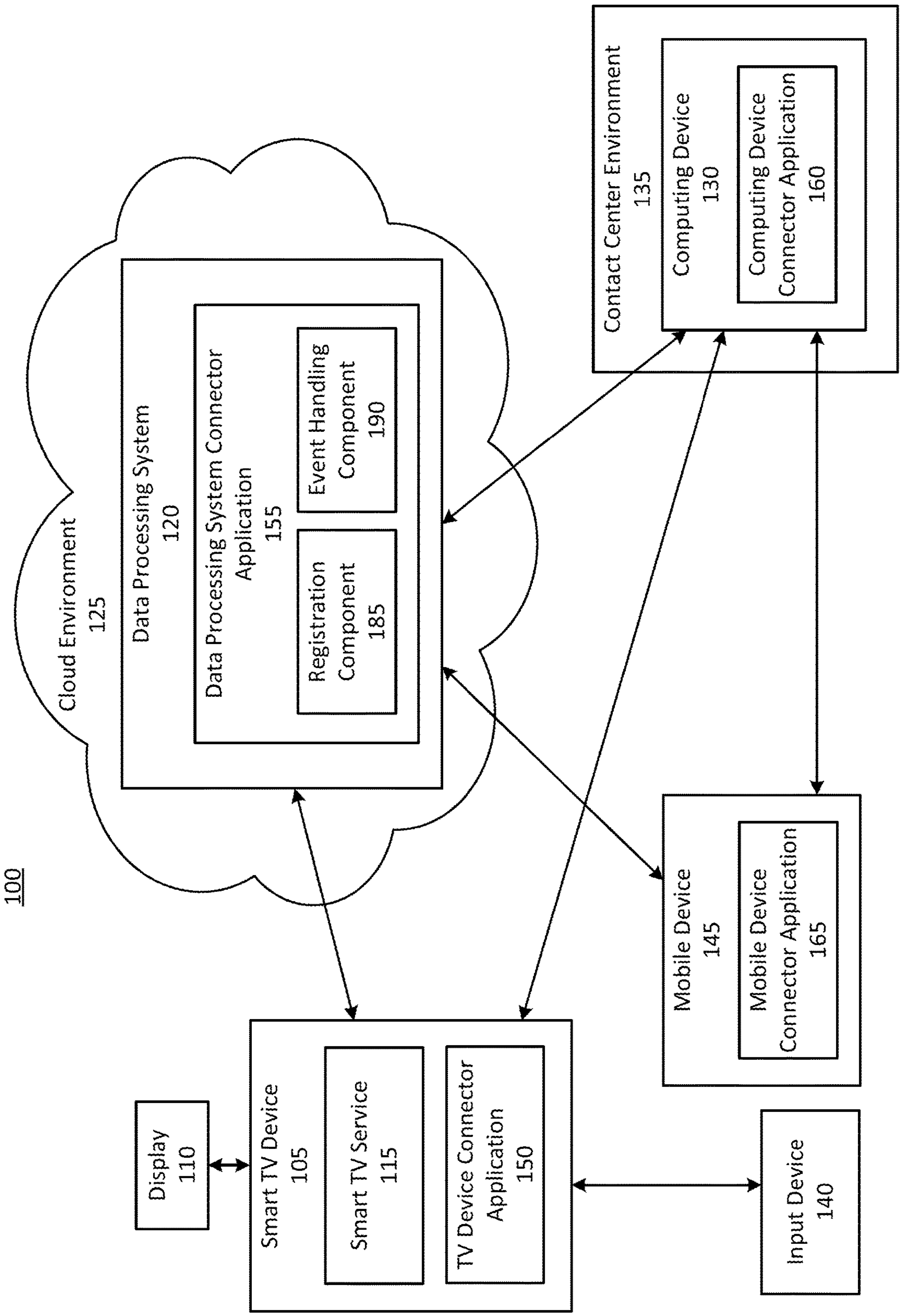
FIG. 1 is a block diagram depicting an example system for establishing service request interactions, according to an illustrative implementation.

Following below are more detailed descriptions of various concepts related to, and implementations of, methods, apparatuses, and systems of establishing service request interactions. The various concepts introduced above and discussed in greater detail below may be implemented in any of numerous ways, as the described concepts are not limited to any particular manner of implementation.

Entities can provide a variety of services for their customers via smart TV devices. For example, a smart TV service can execute on a smart TV device to allow a customer to consume various forms of video or audio content, and to interact with such content. Occasionally, a customer may experience difficulty with the smart TV service and may wish to interact with the company that provides the smart TV service (e.g., through a human representative of the company or an automated electronic service provided by the company) in order to resolve the difficulty, for example by making a request for service. However, it can be difficult for customers to initiate such a service request in a manner that allows the company and the customer to efficiently complete the service request interaction. For example, the issue may arise while the customer is interacting with the smart TV device, but the smart TV device may not be capable of communicating directly with a computing device associated with the company (e.g., an agent's computing device in a contact center environment). As a result, any fault condition or other contextual information from the smart TV device may not be able to be conveyed or transmitted to the computing device associated with the company. Even in instances where such communication may be feasible, the customer may wish to complete the service request interaction through a different communication channel, such as via SMS messages, email, or a telephone call.

In addition, in some instances an entity may provide services to a customer unrelated to a smart TV device or other computing device, but may want to interact with the customer via a smart TV device to complete a service request interaction. For example, interactions between a service provider and a customer may take place at an in person meeting, but this may require a customer to travel to the location of the service provider to complete a service interaction. Depending on the distance between the customer and the service provider, the frequency of such service interactions, and the customer's availability and capability to travel, it can be burdensome for the customer to conduct in-person service request interactions in this manner. As a result, a customer may wish to conduct such service interactions remotely when possible. For example, while a patient may be required to travel to a healthcare provider in order to receive physical treatment or testing, a service request interaction in which the patient consults verbally with the healthcare provider, reviews test results, etc. can be accomplished remotely in some instances.

Media devices, such as smart TV devices, can be used to facilitate such remote service interactions by providing audio and video inputs and outputs to allow a customer to interact with a service provider without traveling to the physical location of the service provider. However, it can be difficult for customers to initiate such a service request in a manner that allows the service provider and the customer to efficiently complete the service request. For example, a smart TV device may not be configured to communicate directly with a computing device of the service provider.

This disclosure provides systems and methods for establishing such remote service request interactions. For example, connector applications may execute on a smart TV device in a customer's home as well as on a computing device in a contact center of a service provider. In addition, a data processing system intermediary to the smart TV device and the computing device in the contact center environment can execute a respective connector application. Together, the connector application may coordinate to allow the smart TV device and the computing device in the contact center environment to communicate via the data processing system to complete the service request interaction. This technical solution can more quickly access a contact center environment via a communication session with a smart TV device, for example, without a second communication session that initially bypasses the smart TV device. Avoiding the second initial communication session can reduce latency as well as processing power, energy requirements and bandwidth that would otherwise be associated with a second initial communication session.

FIG. 1 is a block diagram depicting an example system 100 for establishing service request interactions, according to an illustrative implementation. The system 100 can include a smart TV device 105 coupled to a display 110, a data processing system 120 in a cloud environment 125, and a computing device 130 in a contact center environment 135. The system 100 also can include an input device 140 and a mobile device 145. The input device 140 and the mobile device 145 can be implemented as a single component having the functionality of both the input device 140 and the input device 145. The input device 140 and the mobile device 145 also can be implemented as separate components.

The smart TV device 105 can be or can include a set top box communicatively coupled to the display 110. The display 110 can be a monitor or other type of display device capable of receiving video or audio content from the smart TV device 105 and displaying the received content to a viewer. The display 110 may also include additional output capabilities, such as one or more speakers configured to play audio output. The smart TV device 105 and the display 110 can be configured as separate hardware devices as depicted in FIG. 1. The smart TV device 105 and the display 110 may communicate with one another via one or more wired connections, such as a digital video input (DVI) or high definition media input (HDMI) cables coupling the smart TV device 105 with the display 110. The smart TV device 105 and the display 110 may also communicate via a wireless connection, such as a radio-frequency (RF) or Wi-Fi connection. The smart TV device 105 and the display 110 can also be included within a single hardware device. For example, a television or smart television can include video display capabilities as well as capabilities for executing software such as the smart TV service 115, receiving input via the input device 140, and receiving content items (e.g., from a remote content item server or from a database storing content items within the device itself). Such a device can be a single integrated device that may implement the functionality of the smart TV device 105 and the display 110 together.

The smart TV device 105 can execute a smart TV service 115. The smart TV service 115 can be an application or script configured to provide video or audio content. For example, the smart TV service 115 can be configured to receive streaming video content for display by the display 110 (e.g., from a remote content server or from a database of stored video content local to the smart TV device 105). The smart TV service 115 can also provide a graphical user interface to establish or to facilitate interactions with a user. For example, such an interface can allow the user to select content items to be displayed by the display 110 and to interact with such content items, such as by pausing or resuming playback of the content items. The user can interact with the content provided by the smart TV service 115 by using the input device 140. For example, the input device 140 can be one or more of a remote, a pointing device, a keyboard, or the like, and may communicate with the smart TV device 105 via a wired connection or via a wireless connection such as an infrared signal or other optical input.

In some examples, a user may wish to initiate a service request interaction relating to the smart TV service 115. For example, occasionally the user may have a problem or question regarding the smart TV service 115. The user may therefore want to request help from a service agent or representative. For example, the user may have a question about a user account associated with the smart TV service 115, or may have difficulty interacting with a feature provided by the smart TV service 115. To address the problem or question, the user may wish to interact with a representative or an automated service of the company that provides the smart TV service 115. For example, a customer service representative may work in the contact center environment 135 to handle service requests made by the user.

The representative may use a device such as the computing device 130 to process service requests. For example, the computing device 130 can include a display device, an audio output device such as a speaker, and input devices such as a pointing device and a keyboard, to allow an agent using the computing device 130 to receive and respond to requests for service from customers. The computing device 130 may also execute a program that provides an automated service to help the user address a problem or question the user may have. The contact center environment 135 can include a number of agent or user workstations such as the computing device 130 connected to the internet or other communication network (e.g., the cloud environment 125) to communicate with customer computing devices (e.g., the smart TV device 105 or the mobile device 145), for example via telephone, voice over internet protocol, short message service, instant message, or other mode of communication to manage service requests initiated by the customers.

It can be a technical challenge to establish or to complete such service request interactions between a customer and a service representative in an efficient and convenient manner. For example, there may be no communication channel directly linking the smart TV device 105 with the computing device 130. If the user of the smart TV device 105 initiates the service request in a different manner (e.g., via the mobile device 145, by calling a telephone number of the computing device 130 in the contact center environment 135), then it may be difficult for the user to provide sufficient information about the issue to the computing device 130 in the contact center environment 135. For example, to adequately address the user's question or problem, it may be beneficial for the computing device 130 to receive information related to a status of the smart TV service 115 that executes on the smart TV device 105, and this status information may not be available on the mobile device 145 from which the user initiates the service request interaction.

The system 100 includes several features that address the technical challenges discussed above. For example, the various device connector applications, such as the TV device connector application 150, the data processing system connector application 155, the computing device connector application 160, and the mobile device connector application 165, can be configured to establish communication sessions that allow a user to complete a service request with the computing device 130 in the contact center environment 135. The data processing system 120 can also be configured to establish communication between the smart TV device 105 and the computing device 130, which may not initially be configured to communicate directly with one another.

Each of the TV device connector application 150, the data processing system connector application 155, the computing device connector application 160, and the mobile device connector application 165 can be one or more of a script, an API, a software component, a program, or another form of executable code configured to establish connections between the hardware components of the system 100. For example, the connector applications can be or can include computer instructions formatted in C #, C++, java, or java script. The TV device connector application 150 can execute on the smart TV device 105. The TV device connector application 150 can also execute within or as part of the smart TV service 115. For example, the TV device connector application 150 can be implemented as a software plugin formatted to integrate with or be executed by the smart TV service 115. Similarly, the mobile device connector application 165 may also be included within or executed by another application or software component residing on the mobile device 145.

The connector applications are depicted in FIG. 1 as residing on their respective hardware devices. For example, the TV device connector application 150 is illustrated as residing on the smart TV device 105, the data processing system connector application 155 is illustrated as residing on the data processing system 120, the mobile device connector application 165 is illustrated as residing on the mobile device 140, and the computing device connector application 155 is illustrated as residing on the computing device 130. However, other arrangements are possible. For example, a connector application may reside, may be installed on or may execute on its respective hardware device. However, in other arrangements at least a portion of one or more connector applications may reside on a location remote from its respective hardware device. For example, the smart TV device 105 may interact with a remote device or remotely executed software providing at least a portion of the functionality of the TV device connector application 150 without departing from the scope of this disclosure. The other connector applications, or portions thereof, also may reside or execute remotely from their respective hardware devices, as well.

To establish communication between the smart TV device 105 and the computing device 130, the TV device connector application 150 can be configured to register the smart TV device 105 with the data processing system 120 via the data processing system connector application 155. The data processing system connector application 155 can execute a registration component 185 that can be configured to complete the registration. For example, the TV device connector application 150 may store information corresponding to a network address (e.g., an IP address within the cloud environment 125, which may be a network such as the Internet) of the data processing system 120, and may transmit credentials (e.g., a username and password) to the registration component 185 that executes on the data processing system connector application 155 to cause the data processing system connector application 155 to establish a bidirectional communication channel linking the data processing system 120 and the smart TV device 105.

Communications over the channel established between the data processing system 120 and the smart TV device 105 may be part of a first communication session. The registration component 185 of the data processing system connector application 155 can be further configured to extend the first communication session to the computing device 130, for example by registering with the computing device connector application 160 that executes on the computing device 130 in a similar manner to establish a bidirectional communication channel between the data processing system 120 and the computing device 130. Thus, the smart TV device 105 can communicate with the computing device 130 via the bidirectional links joining the smart TV device 105 with the data processing system 120 and joining the data processing system 120 with the computing device 130. A user may wish to complete at least a portion of a service request interaction via the user's mobile device 145, rather than via the smart TV device 105. Therefore, the mobile device connector application 165 can also be configured to establish a bidirectional communication channel between the mobile device 145 and the computing device 130 by registering itself with the computing device connector application 160. Changing the mode of communication during a service request interaction can be referred to in this disclosure as a deflection, and is described further below.

The user may initiate a service request interaction via the smart TV device 105, for example by using the input device 140. The user can initiate a service request by selecting a button or other user interface element generated by the smart TV service 115 and displayed on the display 110. An example of such an interface is depicted in FIG. 2A. As shown, the display 110 displays a smart TV service interface 200. The interface 200 includes a user prompt 205 that asks whether the user needs help, and includes interface elements that allow the user to select "yes" or "no." The user can use the input device 140 to make the selection in response to the prompt 205. In response to the user selecting "yes," the TV device connector application 150 can establish a communication channel linking the smart TV device 105 with the data processing system 120 by registering itself with the registration component 185 of the data processing system connector application 155, as described above, and the registration component 185 of the data processing system connector application 155 can register itself with the computing device connector application 160 to extend that communication session from the data processing system 120 to the computing device 130 to establish the service request interaction.

Figure 2B:
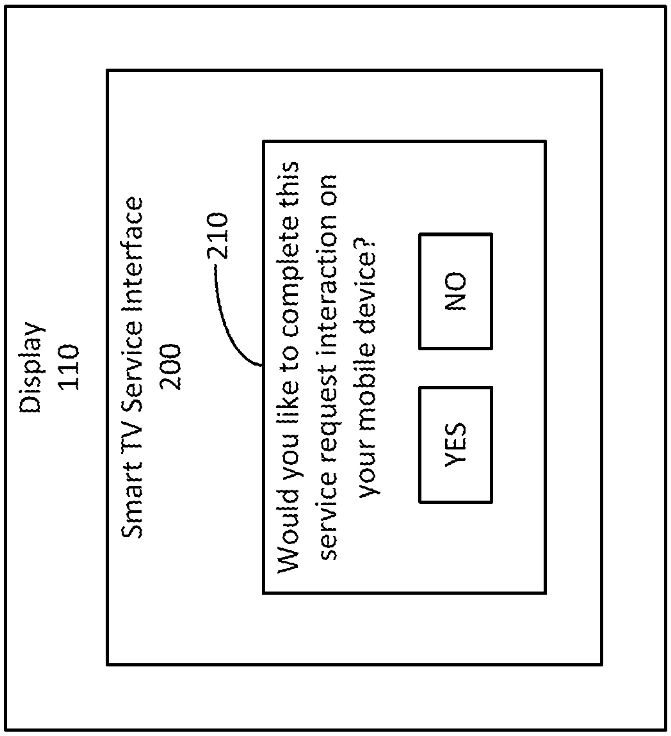
FIGS. 2A and 2B are example user prompts that can be displayed in an interface in connection with the system of FIG. 1, according to an illustrative implementation.
Figure 2A:
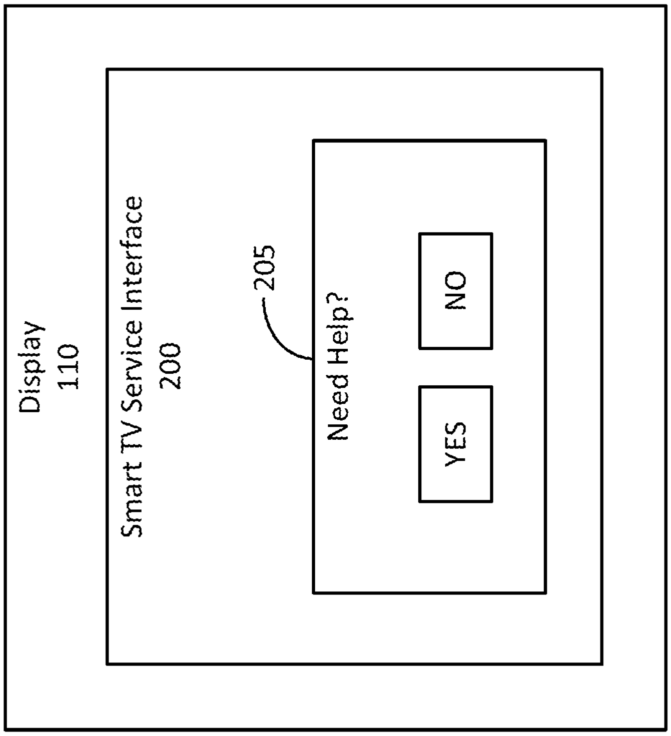

FIG. 2B depicts the smart TV service interface 200 showing a second user prompt 210. The second user prompt 210 can be displayed within the smart TV service interface 200 after the user has initiated a service request (e.g., by selecting "yes" in the user prompt 205 of FIG. 2A). The second user prompt 210 asks whether the user would like to complete the service request interaction via a mobile device (rather than via the smart TV device 105). For example, the input device 140, with which the user interacts with the smart TV device 105, may be a simple remote control having limited functionality and may therefore be less convenient than the mobile device 145, which may include more interface functionality, such as any combination of an electronic display, a touchscreen input, a camera, and a microphone. For example, the mobile device 145 can be a smartphone, a laptop computer, or a tablet computer, and may provide an interface that is easier for the user to use than the smart TV device 105 and the input device 140.

Still referring to FIG. 2B, if the user selects "yes" in response to the user prompt 210, the service request interaction may continue via the mobile device 145, rather than via the smart TV device 105. This can be referred to in this disclosure as a deflection of the service request interaction. Generally, while the deflection of the service request interaction to the mobile device 145 may require that a second communication session be established between the mobile device 145 and the computing device 130 in the contact center environment 135, the deflected service request interaction can be continued on the mobile device 145 in a manner that is convenient for the user. For example, information relating to the service request interaction can be saved by the smart TV device 105 and transferred to the second communication session so that the user does not have to re-enter such information. Additional techniques for providing a more seamless deflection of the service request interaction to the mobile device 145 are described further below.

Figure 3:
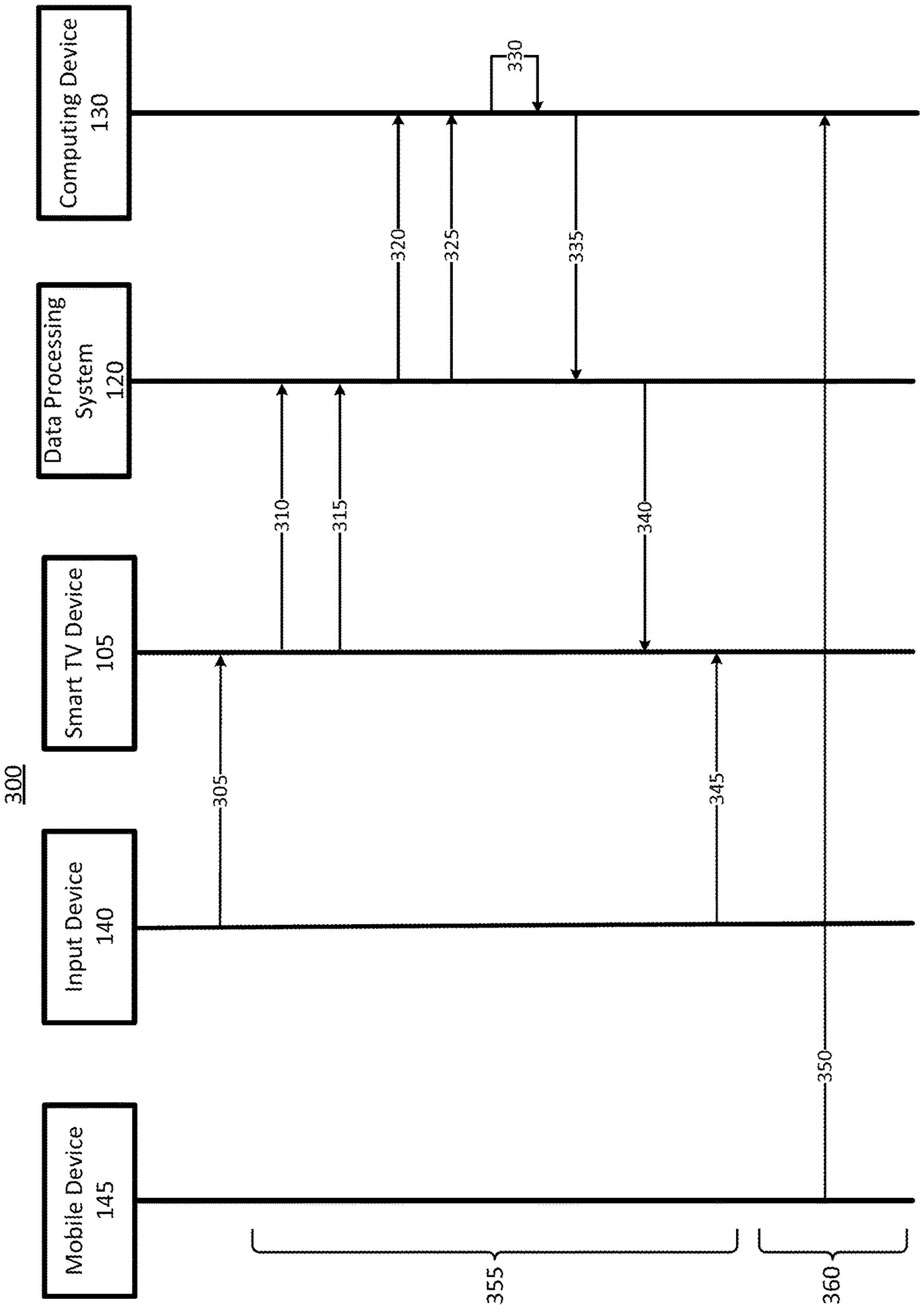
FIG. 3 is a sequence diagram depicting the flow of information in an example system for establishing service request interactions, according to an illustrative implementation.
Figure 4:
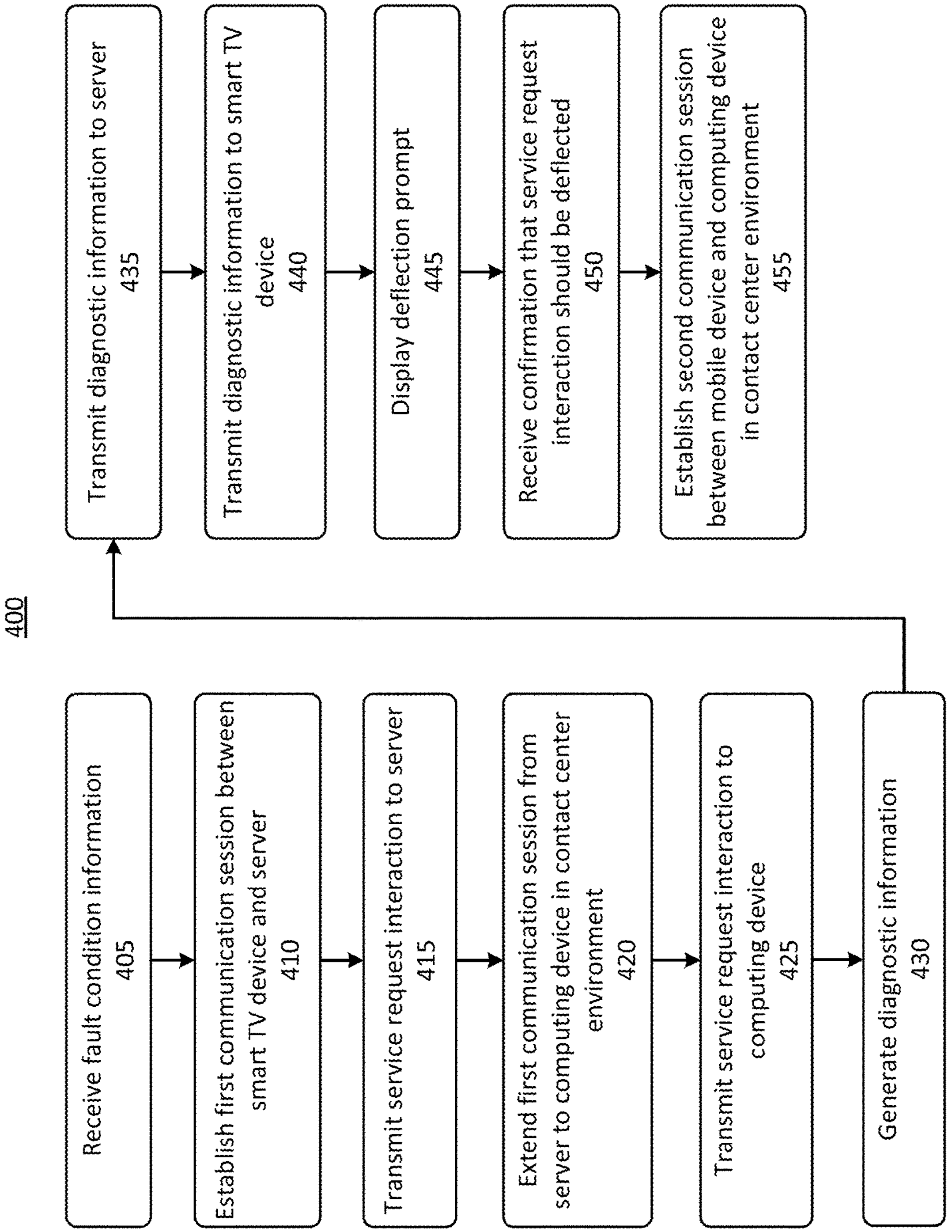
FIG. 4 is a flow diagram of an example method for establishing service request interactions, according to an illustrative implementation.

FIG. 3 is a sequence diagram 300 depicting the flow of information in an example system, such as the system 100, for establishing service request interactions, according to an illustrative implementation. FIG. 4 is a flow diagram of an example method 400 for establishing service request interactions, according to an illustrative implementation. The sequence diagram 300 shows the flow of information between the smart TV device 105, the data processing system 120, the computing device 130, the input device 140, and the mobile device 145. In the sequence diagram 300, arrows represent information transmitted between these components. Generally, these transmissions of information may correspond to blocks shown in the flow diagram representing the example method 400 of FIG. 4. Therefore, FIGS. 3 and 4 are discussed together below.

The method 400 can include receiving fault condition information (ACT 405). This can be performed, for example, by the smart TV device 105 and can correspond to the arrow 305 shown in the sequence diagram 300. Accordingly, the fault condition information can be received from the input device 140. The fault condition information can include any type of information associated with a problem or perceived problem that the user experiences with an aspect of the smart TV service 115. The fault condition information can also include additional information related to the smart TV service 115, such as a current status of one or more parameters of the smart TV service 115.

The method 400 can include establishing a first communication session between the smart TV device 105 and the data processing system 120 (ACT 410). This can be performed, for example, by the smart TV device 105 via the TV device connector application 150, and is represented by the arrow 310 in the sequence diagram 300. The TV device connector application 150 can be configured to register itself with the registration component 185 of the data processing system connector application 155 of the data processing system 120 to establish the first communication session. For example, the TV device connector application 150 can transmit registration information to establish a hypertext transfer protocol (HTTP) or secure shell (SSH) session linking the smart TV device 105 with the data processing system 120. Although not depicted in the sequence diagram 300, the act of establishing the first communication session may include transmitting information from the data processing system 120 to the smart TV device 105 as well. For example, there may be acknowledgment data transmitted from the data processing system 120 to the smart TV device 105 to confirm that the first communication session has been established.

The method 400 can include transmitting a service request interaction to the data processing system 120 (ACT 415). This can be performed, for example, by the smart TV device 105, and is depicted in the sequence diagram by the arrow 315. The service request interaction can be transmitted to the data processing system 120 via the first communication session established in ACT 410. The service request interaction can be received by the event handling component 190 of the data processing system connector application 155. For example, the event handling component 190 can be a software program or other executable instructions configured to receive, transmit, and process one or more events after a communication session has been established. An event can include any information sent from the smart TV device 105 to the data processing system 120, such as fault condition information or contextual information relating to the smart TV service (such as the information displayed on the display 110 that may have confused the user). The service request interaction may include the fault condition information, as well other information relating to the smart TV service 115, the smart TV device 105, and the display 110 that may be relevant to the service request interaction. For example, the service request interaction can include information relating to a state of the smart TV service 115, a model number of the smart TV device 105, or a model number of the display 110. In addition, the service request interaction may include information related to the customer, such as account information, identification information, and the like.

The method 400 can include extending the first communication session from the data processing system 120 to the computing device 130 in the contact center environment 135 (ACT 420). This can be performed by the registration component 185 of the data processing system connector application 155 executing on the data processing system 120, and is depicted in the sequence diagram 300 by the arrow 320. The extension of the first communication session can be accomplished in a manner similar to the establishment of the first communication session between the smart TV device 105 and the data processing system 120. For example, the registration component 185 of the data processing system connector application 155 can register the data processing system connector application 155 with the computing device 130 via the computing device connector application 160. The extension of the first communication session between the data processing system 120 and the computing device 130 can allow for communication to take place between the smart TV device 105 and the computing device 130 via the data processing system 120.

The method 400 can include transmitting the service request interaction to the computing device 130 (ACT 425). This can be performed by the data processing system 120, and is depicted by the arrow 325 in the sequence diagram 300. The service request interaction can include the fault condition information and other information described above in connection with ACT 415, such information relating to a state of the smart TV service smart TV service smart TV service 115, a model of the smart TV device 105 or the display 110, or customer information.

The method 400 can include generating diagnostic information (ACT 430). This can be performed by the computing device 130 in the contact center environment 135, as depicted by the arrow 330 in the sequence diagram 300. The computing device 130 can generate the diagnostic information based on the fault condition information. For example, the computing device 130 can maintain a mapping of various types of diagnostic information that correspond to respective types of fault condition information, and can generate or retrieve the correct diagnostic information by referring to this mapping. The diagnostic information can include one or more suggested tasks for a user to perform to address a problem or issue with the smart TV service 115 for which the user is seeking assistance through the service request interaction. The computing device 130 can transmit the diagnostic information via the first communication session.

The method 400 can include transmitting the diagnostic information to the data processing system 120 (ACT 435). This can be performed by the by the computing device 130 and is depicted in the sequence diagram 300 by the arrow 335. Generally, the computing device 130 can transmit the diagnostic information via the first communication session that was extended to link the computing device 130 and the data processing system 120 in ACT 420. The method 400 can also include transmitting the diagnostic information to the smart TV device 105 (ACT 440). This can be performed by the data processing system 120 and is depicted in the sequence diagram 300 by the arrow 340. The computing data processing system 120 can transmit the diagnostic information to the smart TV device 105 via the first communication session established to link the smart TV device 105 and the data processing system 120 in ACT 410. The smart TV device 105 can respond to receiving the diagnostic information by displaying at least a portion of the diagnostic information to the user. For example, the smart TV device 105 can display a recommended action for the user to take. The diagnostic information can be displayed in an interface generated by the smart TV service 115, such as the smart TV service interface 200 shown in FIG. 2.

In some instances, the service request interaction may not be completed at this point, for example if the user is still experiencing the problem that caused the user to initiate the request even after the user has performed a recommended action to address the problem. The user may therefore wish to continue the service request interaction, for example to receive further information or to interact directly with a customer service representative. The method 400 can therefore include displaying a prompt to deflect the first service request interaction from the smart TV device 105 to the mobile device 145 (ACT 445). The prompt can correspond to the user prompt 210 shown in FIG. 2B, for example. The method can include receiving a confirmation that the service request interaction should be deflected to the mobile device 145 (ACT 450). For example, the user may use the input device 140 to make the confirmation, as indicated by the arrow 345 in the sequence diagram 300. However, the sequence diagram 300 is illustrative only, and therefore the user may instead make the confirmation in a manner not depicted by the sequence diagram 300. For example, the user may make the confirmation via the mobile device 145 itself (e.g., by using a web browsing application residing on the mobile device 145 to visit a predetermined website to complete the service request interaction).

After the user has confirmed that the service request interaction should be deflected from the smart TV device 105 to the mobile device 145, the method 400 can include establishing a second communication between the mobile device 145 and the computing device 130 in the contact center environment 135 (ACT 455). This can be performed, for example, by the mobile device 145 via the mobile device connector application 165, as indicated by the arrow 350 in the sequence diagram 300. The TV mobile device connector application 165 can be configured to register itself with the computing device connector application 160 of the computing device 130 to establish the second communication session. For example, the mobile device connector application 165 can establish a hypertext transfer protocol (HTTP) or secure shell (SSH) session linking the mobile device 145 with the computing device 130.

The computing device 130 can also establish the second communication session in a non-persistent manner, such as by sending an email to the computing device 130. Thus, the second communication session can consist of a series of emails or other forms of correspondence between the mobile device 145 and the computing device 130, even though this correspondence may take place without a dedicated communication channel being established. Although not depicted in the sequence diagram 300, the computing device 130 can also transmit information to the mobile device 145 to establish the second communication session. The second communication session may facilitate completion of the service request interaction via any mode of communication, including email, short message service (SMS) messages, a live text-based chat session, a live video calling session, a telephone call, or any combination of these or other types of communications. For example, the user may use the mobile device 145 to communicate with a customer service representative operating the computing device 130 in the contact center environment 135, or with an automated service executing on the computing device 130.

Using the steps above, a first communication session (represented by the communications within the bracket 355 in the sequence diagram 300) and a second communication session (represented by the communications within the bracket 360 in the sequence diagram 300), separate from the first communication session, are used to facilitate the service request interaction. Although the remainder of the service request interaction may be performed by the user via the separate second communication session, any information transmitted as part of the first communication session linking the smart TV device 105 with the computing device 130 via the data processing system 120 can be saved and made available for use during the second communication session. For example, the fault condition information, the diagnostic information, and any other information relating to the service request information that was initially generated or transmitted as part of the first communication session can be saved for use in the second communication session. At least a portion of this information may also be transmitted to the mobile device 145, so that the mobile device 145 has access to such information during the second communication session. For example, a data file corresponding to the fault condition information, the diagnostic information, or other information from the first communication session can be transmitted from any of the smart TV device 105, the data processing system 120, or the computing device 130 to the mobile device 145, so that the mobile device 145 can use this information during the second communication session. Similarly, information relating to the first communication session can be saved by the computing device 130, so that the computing device 130 can access such information in connection with completing the service request information via the second communication session. Thus, the deflection of the service request interaction can be accomplished in a unified and continuous way from the perspective of the user, despite the fact that two separate communication sessions are used to facilitate the service request interaction.

The computing device 130 can also be configured to authenticate the mobile device 145 prior (or during the process of) establishing the second communication session. This can help to ensure that any sensitive or private information included in the first communication session is not erroneously transmitted to a device of a different user during the second communication session. The user may be asked to use the mobile device 145 to perform a specified task to authenticate the mobile device 145 prior to establishment of the second communication session. For example, the smart TV device 105 can cause the display 110 to display a prompt directing the user to visit a webpage having a predetermined URL using a web browsing application of the mobile device mobile device 145, to authenticate the mobile device 145. The URL for authentication can be displayed to the user, by the smart TV device 105. For example, after receiving confirmation from the user that the user wishes to deflect the service request interaction to the mobile device 145, the smart TV device 105 can display a prompt directing the user to visit the predetermined URL before the second communication session is established. After the user visits the corresponding web page, the computing device 130 can receive an indication that the user has correctly visited the webpage before allowing establishment of the second communication session linking the mobile device 145 and the computing device 130. Similarly, the smart TV device 105 can cause the display 110 to display a prompt including a quick response (QR) code and requesting that the user scan with the mobile device 145 to authenticate the mobile device 145. The computing device 130 can receive an indication that the user has correctly scanned the QR code from the mobile device 145, and can then allow the second communication session to be established to link the computing device 130 and the mobile device 145.

The smart TV device 105 can also cause the display 110 to display a prompt asking the user to call a predetermined telephone number from the mobile device 145 to authenticate the mobile device 145. The predetermined telephone number can be a telephone number associated with the computing device 130, and the second communication session may automatically be established when the user calls the predetermined telephone number from the mobile device 145 and the computing device 130 accepts the corresponding call. For example, the telephone call can correspond to the second communication session, and can allow the user to interact with a customer service representative or automated service in the contact center environment 135.

The smart TV device 105 can also cause the display 110 to display a prompt asking the user to enter a telephone number associated with the mobile device 145. The user can enter the number, for example, using the input device 140. The smart TV device 105 can then transmit the telephone number to the computing device 130 (e.g., via the first communication session), and a customer service representative or automated service can dial the telephone number from the computing device 130 to connect the computing device 130 and the mobile device 145 via telephone call. That telephone call can correspond to the second communication session, and can allow the user to interact with a customer service representative or automated service in the contact center environment contact center environment 135.

Figure 5:
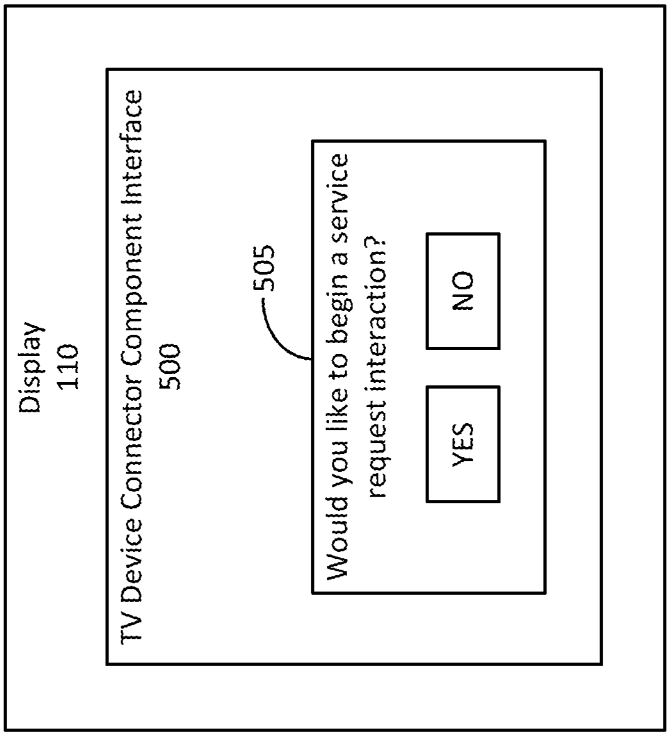
FIG. 5 is an example user prompt that can be displayed in an interface in connection with the system of FIG. 1, according to an illustrative implementation.

As described above, in some instances a user may wish to initiate a service request interaction with a remote service provider that is unrelated to the smart TV device 105 or the smart TV service 115. However, the user may wish to use the smart TV device 110 to complete at least part of the service request interaction. For example, the user may wish to use the smart TV device 115 to perform a video conference with a physician, a tutor, or another remote service provider, rather than meeting at the physical location of the service provider. The user may initiate such a service request interaction via the smart TV device 105, for example by using the input device 140. The user can initiate a service request by selecting a button or other user interface element generated by the TV device connector application 150 and displayed on the display 110. An example of such an interface is depicted in FIG. 5. As shown, the display 110 displays TV device connector application interface 500. The interface 500 includes a user prompt 505 that asks whether the user would like to begin a service request interaction, and includes interface elements that allow the user to select "yes" or "no." The user can use the input device 140 to make the selection in response to the prompt 505. In response to the user selecting "yes," the TV device connector application 150 can establish a communication channel linking the smart TV device 105 with the data processing system 120 by registering itself with the data processing system connector application 155, and the computing device connector application 160 can register itself with the data processing system connector application 155 to extend that communication session from the data processing system 120 to the computing device 130 to facilitate the service request. The registration of the TV device connector application 150 and the computing device connector application also may occur prior to the user indicating a desire to begin the service request interaction.

Figure 6:
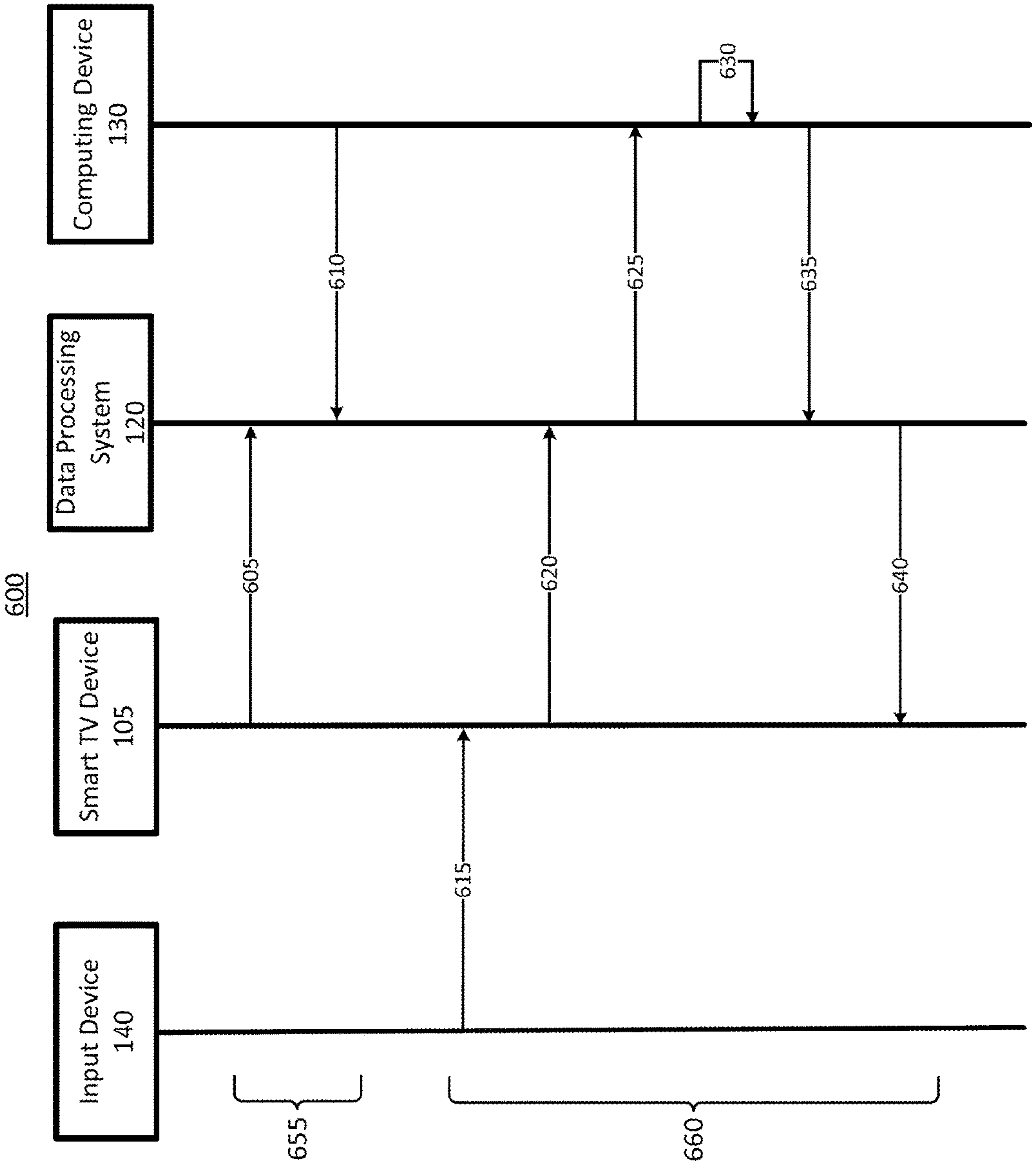
FIG. 6 is a sequence diagram depicting the flow of information in an example system for establishing service request interactions, according to an illustrative implementation.
Figure 7:
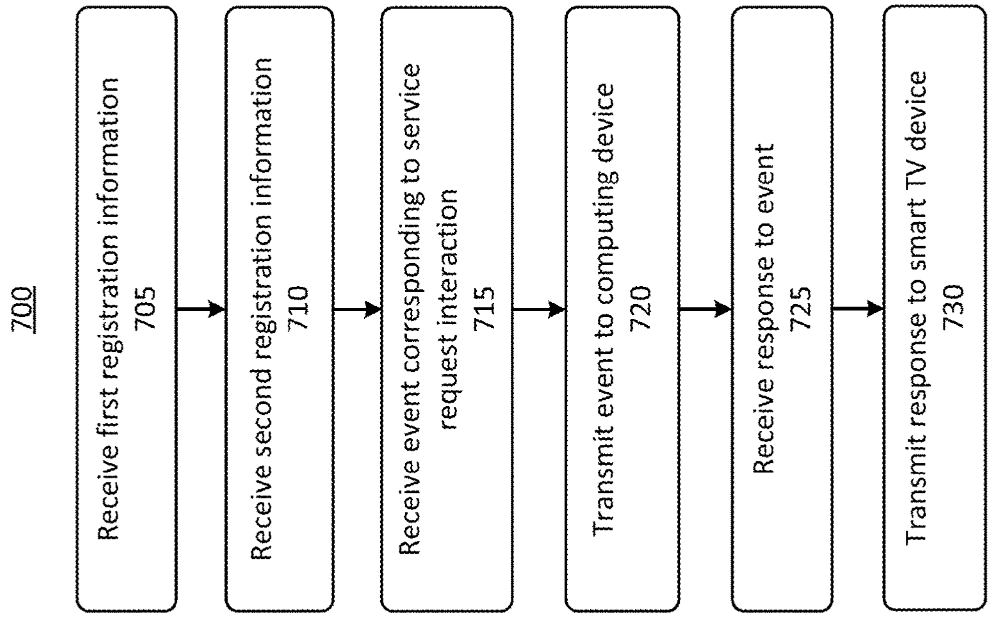
FIG. 7 is a flow diagram of an example method for establishing service request interactions, according to an illustrative implementation.

FIG. 6 is a sequence diagram 600 depicting the flow of information in an example system, such as the system 100, for allocating data messages between computing devices, according to an illustrative implementation. FIG. 7 is a flow diagram of an example method 700 for allocating data messages between computing devices, according to an illustrative implementation. The sequence diagram 600 shows the flow of information between the smart TV device 105, the data processing system 120, the computing device 130, and the input device 140. In the sequence diagram 600, arrows represent information transmitted between these components. The transmissions of information represented in the sequence diagram 600 of FIG. 6 can correspond to blocks shown in the flow diagram representing the example method 700 of FIG. 7. FIGS. 6 and 7 are discussed together below.

The method 700 can include receiving first registration information (ACT 705). This can be performed, for example, by the registration component 185 of the data processing system connector application 155 that executes on the data processing system 120 and can correspond to the arrow 605 shown in the sequence diagram 600. The first registration information can include any information that may be used by the data processing system connector application 155 to register with the TV device connector application 150. For example, the TV device connector application 150 may cause the smart TV device 105 to transmit the first registration information corresponding to an identification of the smart TV device 105, such as a hardware identifier (e.g., a serial number of MAC address) or a network address of the smart TV device 105 (e.g., an IP address or port number). The first registration information can also include information identifying a user of the smart TV device 105, such as a name, an address, an identification number, or demographic information. The first registration information can also include information identifying a representative within the contact center environment 135 with whom the user of the smart TV device 105 wishes to interact. For example, the contact center environment 135 can be a healthcare organization, and the first registration information can include an indication of a physician by whom the user of the smart TV device 105 is treated. The registration component 185 of the data processing system connector application 155 can receive the first registration information from the TV device connector application 150 via a hypertext transfer protocol (HTTP) or secure sockets layer (SSL) session linking the smart TV device 105 with the data processing system 120.

The method 700 can include receiving second registration information (ACT 710). This can be performed, for example, by the registration component 185 of the data processing system connector application 155 that executes on the data processing system 120, and can correspond to the arrow 610 shown in the sequence diagram 600. Thus, the registration component 185 of the data processing system connector application 155 can receive the second registration information from the computing device connector application 160 that executes on the computing device 130. The second registration information can include any information that may be used by the data processing system connector application 155 to register with the computing device connector application. For example, the computing device connector application 160 may cause the computing device 130 to transmit the second registration information corresponding to an identification of the computing device 130, such as a hardware identifier (e.g., a serial number of MAC address) or a network address of the computing device 130 (e.g., an IP address or port number). The second registration information can also include information identifying a user of the computing device 130, such as a name, an address or an identification number. The second registration information can also include information identifying the user of the smart TV device 105 with whom the user of the computing device 130 interacts regularly. For example, the contact center environment 135 can be a healthcare organization, and the second registration information can include the name of a patient who is treated by a user of the computing device 130. The data processing system connector application 155 can receive the second registration information from the computing device connector application 160 via a hypertext transfer protocol (HTTP) or secure sockets layer (SSL) session linking the computing device 130 with the data processing system 120.

ACTS 705 and 710 of the method 700 can be performed as part of a registration phase 655, indicated by the bracket in the sequence diagram 600. During this registration phase 655, the smart TV device 105 and the computing device 130 each can communicate with the data processing system 120 to provide any information necessary for the data processing system 120 to facilitate communications between the smart TV device 105 and the computing device 130. For example, the data processing system 120 can use the first registration information received in ACT 705 and the second registration information received in act 710 to establish a communication session between the smart TV device 105 and the computing device 130. The communication session can use the data processing system 120 as an intermediary between the smart TV device 105 and the computing device 130. For example, communications sent by the smart TV device 105 to the computing device 130 as part of the communication session can be delivered first to the data processing system 120, which can forward them on to the computing device 130. Similarly, communications sent by the computing device 130 to the smart TV device 105 as part of the communication session can also be delivered first to the data processing system 120, which can forward them on to the smart TV device 105. The communication session can also be established directly between the smart TV device 105 and the computing device 130, such that the smart TV device 105 and the computing device 130 may transmit information directly to one another without using the data processing system 120 as an intermediary.

To establish the communication session, the data processing system 120 can use both the first registration information and the second registration information. For example, the registration component 185 of the data processing system connector application 155 may perform operations according to a set of rules or logic using information corresponding to the first registration information and the second registration information to determine that the communication session should be established between the smart TV device 105 and the computing device 130. In an example, the first registration information received from the smart TV device 105 may include information identifying the particular computing device 130 (or a user of the computing device 130, such as a physician who treats user of the smart TV device 105), and the registration component 185 of the data processing system connector application 155 can match that identification to data included in the second registration information to determine that a communication session should be established between the smart TV device 105 and the computing device 130.

The sequence diagram 600 also includes a service request interaction phase 660. In the service request interaction phase 660, the method 700 can include receiving an event corresponding to a service request interaction (ACT 715). This can be performed, for example, by the event handling component 190 of the data processing system connector application 155. The event can correspond to a user selection made via the input device 140, for example while the user is interacting with the interface 500 shown in FIG. 5, as indicated by the arrow 615 in the sequence diagram 600. The event can indicate that the user wishes to initiate a service interaction with a representative in the contact center environment 135 (e.g., a user of the computing device 130). Thus, the user's selection can cause the TV device connector application 150 executing on the smart TV device 105 to transmit the event to the event handling component 190 of the data processing system 120, as indicated by the arrow 620 in the sequence diagram 600. Receiving the event (ACT 715) can be performed, for example, by the event handling component 190 of the data processing system connector application 155 that executes on the data processing system 120. The event can be received either before or after the communication session is established between the smart TV device 105 and the computing device 130. For example, the event can be received as a part of the communication session, or can trigger establishment of the communication after it is received by the data processing system connector application 155. In addition, the event can include information related to the user of the smart TV device 105, such as account information, identification information, and the like. Although not shown in the sequence diagram 600, the data processing system connector application 155 can also receive the event corresponding to the service request interaction from the computing device connector application 160 executing on the computing device 130. That is, a user of the computing device 130 may be able to initiate the service interaction by using the computing device 130 to transmit the event to the data processing system connector application 155 that executes on the data processing system 120.

The method 700 can also include transmitting the event to the computing device connector application 160 that executes on the computing device 130 (ACT 720). This can also be performed by event handling component 190 of the data processing system connector application 155, and is depicted by the arrow 625 shown in the sequence diagram 600. The data processing system connector application 155 may transmit the event to the computing device connector application 160 in the same format in which the event was received from the TV device connector application 150. The event handling component 190 of the data processing system connector application 155 can also modify the event before transmitting the event to the computing device connector application 160. For example, the event handling component 190 of the data processing system connector application 155 may modify the event to use a different communications protocol or data format supported by the computing device 130 before transmitting the event to the computing device connector application 160 that executes on the computing device 130.

The computing device 130 can generate diagnostic information, as depicted by the arrow 630 in the sequence diagram 600. The computing device 130 can generate the diagnostic information based on the event transmitted by the data processing system connector application 155 in ACT 720. The diagnostic information can be generated in an automated fashion, for example, by the computing device connector application 160, based on information included in the event. The diagnostic information can also be generated by a user of the computing device 130, responsive to the event, and the user can input the diagnostic information to the computing device connector application 160.

The method 700 can include receiving a response to the event (ACT 725). This can be performed, for example, by the event handling component 190 of the data processing system connector application 155 that executes on the data processing system 120, as depicted in the sequence diagram 600 by the arrow 635. Generally, the computing device 130 can transmit the response to the event via the first communication session that was established to support the service interaction phase 660. The response can include the diagnostic information. The method 700 can also include transmitting the response to the smart TV device 105 (ACT 730). This can be performed by the data processing system connector application 155 that executes on the data processing system 120 and is depicted in the sequence diagram 600 by the arrow 640.

The data processing system 120 can transmit the response to the smart TV device 105 via the first communication session. The smart TV device 105 can respond to receiving the response from the data processing system 120 by displaying information corresponding to the response to the user. The user can then input a new event, for example via the input device 140, and the data flow illustrated by the arrows 615, 620, 625, 630, 635, and 640 can be repeated to allow the user of the smart TV device 105 and the representative using the computing device 130 to interact until the service interaction is completed. For example, the input device 140 may correspond to a microphone or a video camera, and the information sent between the smart TV device 105 and the computing device 130 may correspond to audio and video data of a live video chat between the user of the smart TV device 105 and the representative using the computing device 130. Thus, the data processing system 120 acts as an intermediary to allow interaction between the smart TV device 105 and the computing device 130.

The data processing system 120 can also be configured to facilitate a direct connection between the smart TV device 105 and the computing device 130. For example, the data processing system connector application 155 that executes on the server can receive information from the smart TV device 105 corresponding to an address of the smart TV device 105 and can transmit that information to the computing device 130. This can be performed, for example, by registration component 185. The computing device connector application 160 that executes on the computing device 130 can use the address information to establish communication directly with the smart TV device 105. The data processing system connector application 155 that executes on the server can also receive information from the computing device 130 corresponding to an address of the computing device 130 and can transmit that information to the smart TV device 105. The computing device connector application 150 that executes on the smart TV device 105 can use the address information to establish communication directly with the computing device 130.

In some instances, part of the service request interaction be completed via another device, such as the mobile device 145. For example, the service request may be completed via a second communication session linking the mobile device 145 with the computing device 130 in the contact center environment 135. The smart TV device 105 can cause the display 110 to display a prompt asking the user to call a telephone number from the mobile device 145, similar the example described above in connection with FIGS. 2-4. The telephone number can be a telephone number associated with the computing device 130, and the second communication session may automatically be established when the user calls the telephone number from the mobile device 145 and the computing device 130 accepts the corresponding call. For example, the telephone call can correspond to the second communication session, and can allow the user of the smart TV device 105 to interact with the representative using the computing device 130 in the contact center environment 135.

The smart TV device 105 can also cause the display 110 to display a prompt asking the user to enter a telephone number associated with the mobile device 145. The user can enter the telephone number, for example, using the input device 140. The TV device connector application 150 that executes on the smart TV device 105 can then transmit the telephone number to the computing device 130 (e.g., via the first communication session), and the representative using the computing device 130 can dial the telephone number from the computing device 130 to connect the computing device 130 with the mobile device 145 via a telephone call. That telephone call can correspond to the second communication session, and can allow the user to interact with a representative in the contact center environment contact center environment 135.

Figure 8:
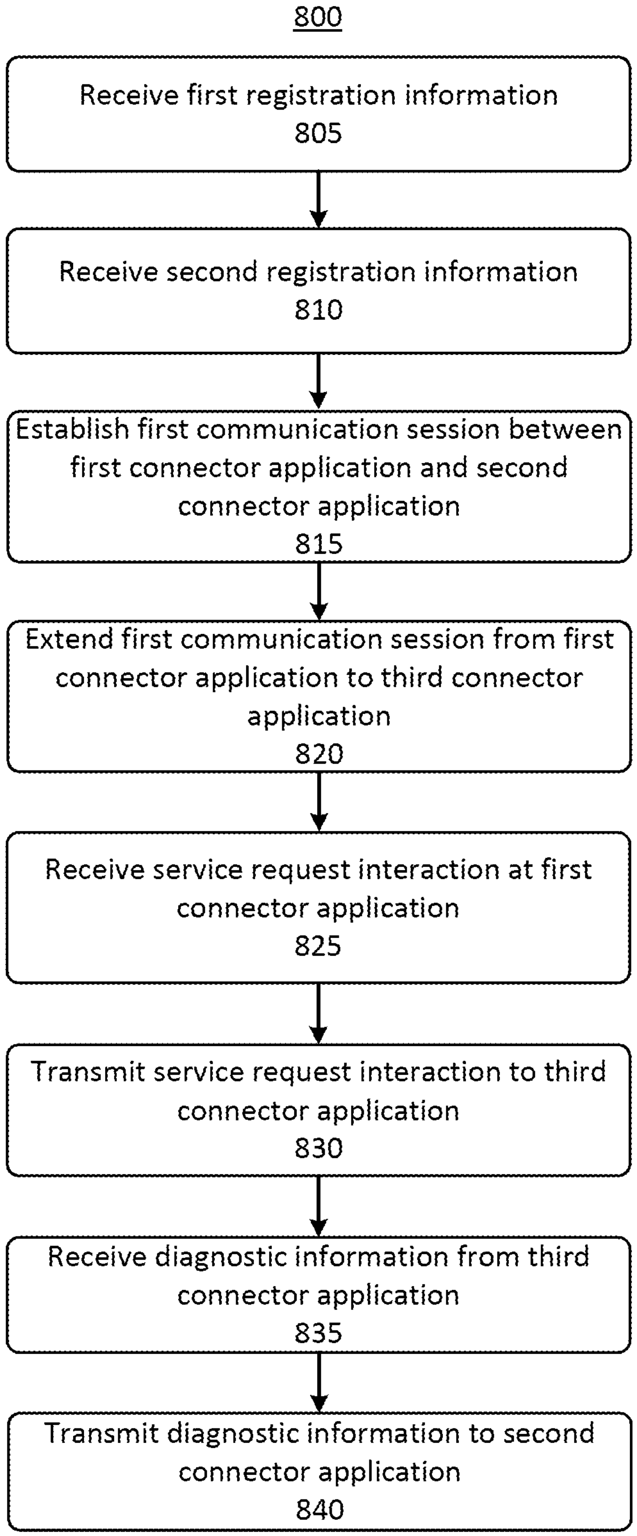
FIG. 8 is a flow diagram of an example method for establishing service request interactions, according to an illustrative implementation.

FIG. 8 is a flow diagram of an example method 800 for establishing service request interactions, according to an illustrative implementation. Referring to FIG. 8, the method 800 can include receiving first registration information (ACT 805). This can be performed, for example, by the registration component 185 of the data processing system connector application 155 that executes on the data processing system 120. The first registration information can be received, for example, from the smart TV device 105. The first registration information can include any information that may be used by the data processing system connector application 155 to register with the TV device connector application 150. For example, the TV device connector application 150 may cause the smart TV device 105 to transmit the first registration information corresponding to an identification of the smart TV device 105, such as a hardware identifier (e.g., a serial number of MAC address) or a network address of the smart TV device 105 (e.g., an IP address or port number). The first registration information can also include information identifying a user of the smart TV device 105, such as a name, an address, an identification number, or demographic information. The first registration information can also include information identifying a representative within the contact center environment 135 with whom the user of the smart TV device 105 wishes to interact.

The method 800 can include receiving second registration information (ACT 810). This can also be performed, for example, by the registration component 185 of the data processing system connector application 155 that executes on the data processing system 120. The second registration information can be sent by the computing device connector application 160 that executes on the computing device 130. The second registration information can include any information that may be used by the data processing system connector application 155 to register with the computing device connector application. For example, the computing device connector application 160 may cause the computing device 130 to transmit the second registration information corresponding to an identification of the computing device 130, such as a hardware identifier (e.g., a serial number of MAC address) or a network address of the computing device 130 (e.g., an IP address or port number). The second registration information can also include information identifying a user of the computing device 130, such as a name, an address or an identification number. The second registration information can also include information identifying the user of the smart TV device 105 with whom the user of the computing device 130 interacts regularly.

The method 800 can include establishing a first communication session between the TV device connector application that executes on the smart TV device 105 and the data processing system connector application 155 that executes on the data processing system 120 (ACT 815). This can be performed, for example, by the registration component 185 of the data processing system connector application 155. The registration component 185 of the data processing system connector application 155 can use the first registration information received in ACT 805 to establish the first communication session. For example, using the first registration information, the registration component 185 of the data processing system connector application 155 can establish a hypertext transfer protocol (HTTP) or secure sockets layer (SSL) session linking the computing device 130 with the data processing system 120.

The method 800 can include extending the first communication session from the data processing system connector application 155 that executes on the data processing system 120 to the computing device connector application 160 that executes on the computing device 130 in the contact center environment 135 (ACT 820). This can be performed by the registration component 185 of the data processing system connector application 155 executing on the data processing system 120. The extension of the first communication session can be accomplished in a manner similar to the establishment of the first communication session between the smart TV device 105 and the data processing system 120. For example, the registration component 185 of the data processing system connector application 155 can establish an HTTP or SSL session linking the computing device 130 with the data processing system 120. The extension of the first communication session between the data processing system 120 and the computing device 130 can allow for communication to take place between the smart TV device 105 and the computing device 130, via the data processing system connector application 155 of the data processing system 120.

The method 800 can include receiving a service request interaction (ACT 825). This can be performed, for example, by the event handling component 190 of the data processing system connector application 155. The service request interaction can be received as one or more events, which may be initiated on the smart TV device 105 by a user. The request can indicate that the user wishes to initiate a service interaction with a representative in the contact center environment 135 (e.g., a user of the computing device 130). The request can correspond to a request for assistance with an aspect of the smart TV device 105, for example. In such a case, the request may also include fault condition information relating to a state or context of the smart TV device 105 or the smart TV service 115. The TV device connector application 150 executing on the smart TV device 105 can transmit the request to the event handling component 190 of the data processing system 120. The request can be received either before or after the communication session is established between the smart TV device 105 and the computing device 130. For example, the request can be received as a part of the first communication session established in ACT 815, or can itself trigger establishment of the first communication after it is received by the registration component 185 of the data processing system connector application 155.

The method 800 can also include transmitting the service request interaction to the computing device connector application 160 that executes on the computing device 130 (ACT 830). This can also be performed by the event handling component 190 of the data processing system connector application 155. The data processing system connector application 155 may transmit one or more events corresponding to the service request interaction to the computing device connector application 160 in the same format in which the one or more events were received from the TV device connector application 150 in ACT 825. The event handling component 190 of the data processing system connector application 155 can also modify the service request interaction before transmitting it to the computing device connector application 160. For example, the event handling component 190 of the data processing system connector application 155 may modify the service request interaction to use a different communications protocol or data format supported by the computing device 130 before transmitting the event to the computing device connector application 160 that executes on the computing device 130.

After the service request interaction is transmitted to the computing device connector component 160, the computing device 130 can generate diagnostic information. The computing device 130 can generate the diagnostic information based on any information contained in the service request interaction. The diagnostic information may include any information that is responsive to the service request interaction. The diagnostic information can be generated in an automated fashion, for example, by the computing device connector application 160, based on information included in the event. The diagnostic information can also be generated by a user of the computing device 130, responsive to the event, and the user can input the diagnostic information to the computing device connector application 160. Generally, the diagnostic information can include one or more suggested tasks for the user to perform.

The method 800 can include receiving the diagnostic information, responsive to the service interaction request (ACT 835). This can be performed, for example, by the event handling component 190 of the data processing system connector application 155 that executes on the data processing system 120. Generally, the computing device 130 can transmit the response to the event via the first communication session that was established and extended from the server connector application 155 to the computing device connector application 160.

The method 800 can also include transmitting the diagnostic information to the TV connector application 150 of the smart TV device 105 (ACT 840). This can be performed by the event handling component 190 of the data processing system connector application 155 that executes on the data processing system 120. The event handling component 190 can transmit the diagnostic to the TV connector application 150 that executes on the smart TV device 105 via the first communication session. The smart TV device 105 can respond to receiving the diagnostic information from the data processing system 120 by causing the display 110 to display information corresponding to the diagnostic information for view by the user. The user can then input a new information, for example via the input device 140, and the ACTS 825, 830, 835, and 840 of the method 800 can be repeated to allow the user of the smart TV device 105 and the representative using the computing device 130 to interact until the service interaction is completed.

Figure 9:
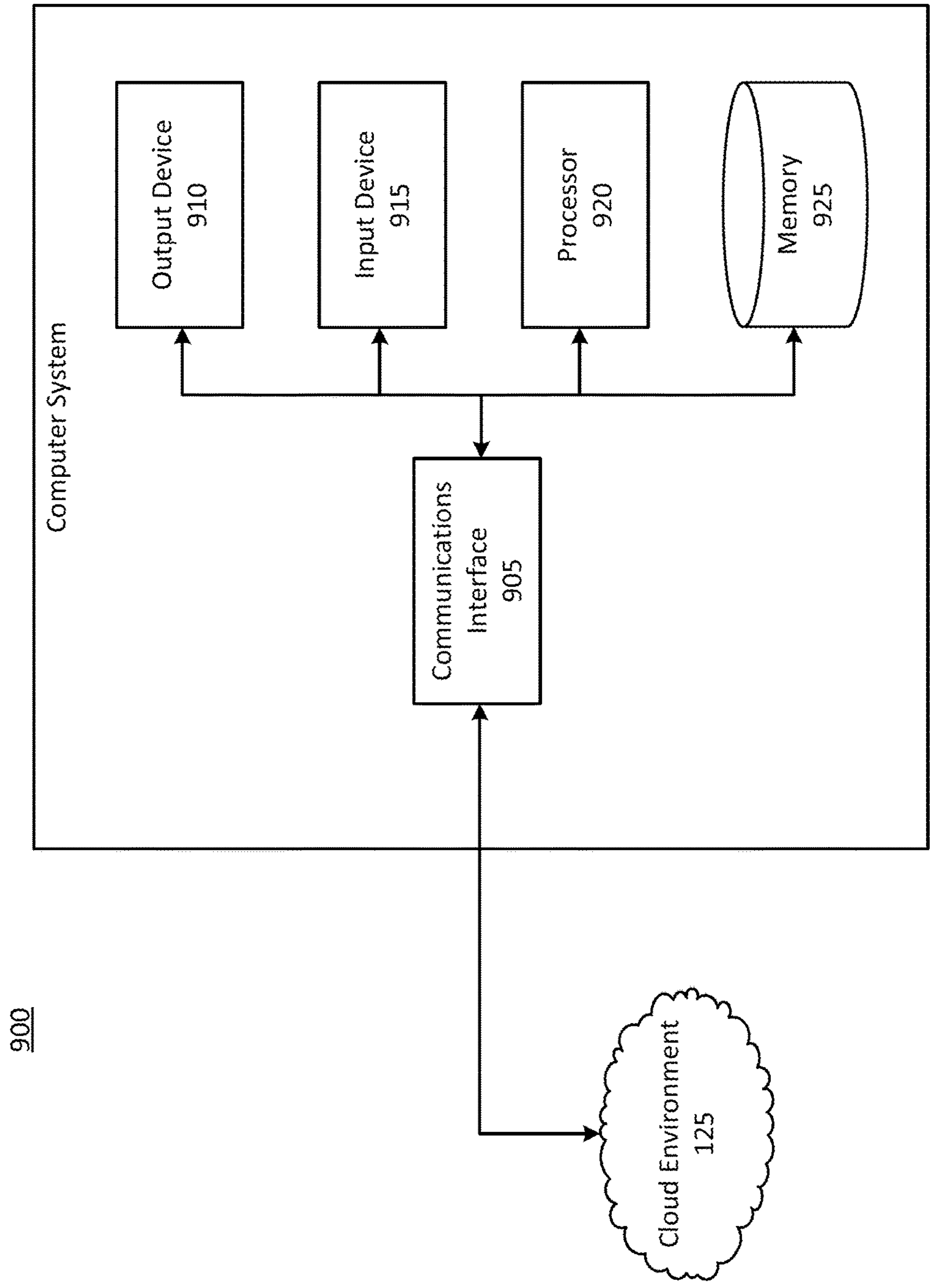
FIG. 9 is a block diagram illustrating a general architecture for a computer system that may be employed to implement elements of the systems and methods described and illustrated herein, according to an illustrative implementation.

FIG. 9 is a block diagram illustrating a general architecture for a computer system that may be employed to implement elements of the systems and methods described and illustrated herein (including the smart TV device 105, the data processing system 120, the computing device 130, the input device 140, and the mobile device 145), according to an illustrative implementation. The computer system 900 can be used to provide information via the cloud environment 125, for example. The computer system 900 includes one or more processors 920 communicatively coupled to at least one memory 925, one or more communications interfaces 905, and one or more output devices 910 (e.g., one or more display units, which may correspond to or may be similar to the display 110) and one or more input devices 915, which may correspond to or may be similar to the input device 140. The processors 920 can be included in the smart TV device 105, the data processing system 120, the computing device 130, and the mobile device 145, for example.

The memory 925 can include computer-readable storage media, and can store computer instructions such as processor-executable instructions for implementing the operations described herein. The smart TV device 105, the data processing system 120, the computing device 130, and the mobile device 145 can include the memory 925 to store contact center data, customer data such as a user profile, or employee data such as data relating to a contact center employee who uses the computing device 130, for example. The processors 920 can execute instructions stored in the memory 925 and can read from or write to the memory information processed and or generated pursuant to execution of the instructions.

The processors 920 can be communicatively coupled to or control the communications interfaces 905 to transmit or receive information pursuant to execution of instructions. For example, the communications interfaces 905 can be coupled to a wired or wireless network, bus, or other communication means and can allow the computer system 900 to transmit information to or receive information from other devices (e.g., other computer systems). One or more communications interfaces 905 can facilitate information flow between the components of the system 900. In some implementations, the communications interfaces 905 can be configured (e.g., via hardware components or software components) to provide a website as an access portal to at least some aspects of the computer system 900. Examples of communications interfaces 905 include user interfaces.

The output devices 910 can allow information to be viewed or perceived in connection with execution of the instructions. The input devices 915 can allow a user to make manual adjustments, make selections, enter data or other information, or interact in any of a variety of manners with the processor during execution of the instructions.

The subject matter and the operations described herein can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "data processing system" or "computing device," "module," "engine," or "component" encompasses apparatuses, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination thereof. The apparatus and execution environment can realize various different computing model infrastructures, such as web services, distributed computing and grid computing infrastructures. The smart TV device 105, the cloud environment 125, the computing device 130, and the mobile device 145, among others, can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the system 100) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A computing system such as the system 100 can include clients and servers. A client and server are generally remote from each other and typically interact through a communication network (e.g., the cloud environment 125). The relationship of client and server arises by virtue of computer programs running on the respective computers and having a client-server relationship to each other. Data generated at the client device (e.g., a result of the user interaction) can be received from the client device at the server.

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the system 100, or the various components thereof, can be a single module or a logic device having one or more processing circuits.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, the connector applications such as the TV device connector application 150, the data processing system connector application 155, the computing device connector application 160, or the mobile device connector application 165 can include or can be wired for management (WFM) or enterprise resource planning (EFP) computer system management applications. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to establish communication sessions, comprising:

a data processing system having at least one processor coupled with memory, the data processing system to communicatively couple with a first computing device and a second computing device in a contact center environment, the data processing system to:

establish, using registration information of the first computing device, a communication session between the data processing system and the first computing device;

receive, from the first computing device via the communication session, a request for service that identifies event information and a fault condition on the first computing device;

extend the communication session with the first computing device over a communication network to the second computing device in the contact center environment;

transmit the request for service from the first computing device to the second computing device in the contact center environment via the communication session; and communicate, via the communication session, response data identifying diagnostic information generated by the second computing device for the first computing device based on the event information and the fault condition of the request for service.

2. The system of claim 1, comprising:

the first computing device including at least one of a set top box, a media device, or a smart TV.

3. The system of claim 1, comprising:

the first computing device including a set top box communicatively coupled with a display.

4. The system of claim 1, comprising:

the first computing device having video display capability.

5. The system of claim 1, comprising:

the first computing device including an audio input, an audio output, a video input, and a video output.

6. The system of claim 1, comprising:

the data processing system to provide, to a mobile device associated with the first computing device, at least a portion of the response data from the communication session, responsive to establishment of a second communication session established between the mobile device and the second computing device in the contact center environment.

7. The system of claim 1, comprising:

the data processing system to provide, to a second communication session between a mobile device and the first computing device in the contact center environment, at least a portion of the response data from the communication session, responsive to an indication to transfer the request for service from the first communication device to the mobile device.

8. The system of claim 1, comprising the data processing system to:

receive, from the first computing device via the communication session, the request for service that identifies context information associated with a user of the first computing device; and communicate, via the communication session, the response data that identifies one or more tasks for the user to perform as identified by the second computing device using the context information.

9. The system of claim 1, comprising the data processing system to:

identify, using the registration information of the first computing device, the contact center environment with which to handle the request for service; and extend the communication session with the first computing device to the second computing device in the contact center environment identified using the registration information.

10. The system of claim 1, comprising the data processing system to:

receive, from the second computing device in the contact center environment, registration information of the second computing device; and extend the communication session the with the first computing device to the second computing device in the contact center environment using the registration information.

11. The system of claim 1, comprising:

an application executable on the first computing device to:

transmit, to the data processing system, the registration information to establish the communication session between the first computing device and the data processing system;

identify, for the request for service, the event information;

transmit the request for service identifying the event information to the data processing system to extend the communication session with the first computing device over the communication network to the second computing device; and receive, via the communication session, the response data generated by the second computing device using the event information of the request for service.

12. The system of claim 1, comprising an application on the first computing device to:

receive, via an interaction on a prompt presented on a display, an indication to transfer the request for service from the first computing device to a mobile device associated with the first computing device; and provide, responsive to the indication to transfer, at least a portion of the response data to the mobile device for a second communication session between the mobile device and the second computing device to continue handling of the request for service.

13. The system of claim 1, comprising an application on the first computing device to:

present, via a display, a quick response (QR) code for authenticating a mobile device with the second computing device to handle the request for service; and provide, responsive to the mobile device scanning the QR code to authenticate with the second computing device, at least a portion of the response data to the mobile device for a second communication session between the mobile device and the second computing device to continue handling of the request for service.

14. The system of claim 1, comprising an application on the first computing device to:

present, via a display, an address referencing a webpage, to enter on a mobile device for authentication with the second computing device; and provide, responsive to accessing the webpage referenced by the address to authenticate with the second computing device, at least a portion of the response data to the mobile device for a second communication session between the mobile device and the second computing device to continue handling of the request for service.

15. The system of claim 1, comprising an application on the first computing device to:

transmit, via the communication session, the request for service identifying a fault condition on the first computing device; and receive, via the communication session, the response data identifying diagnostic information generated by the second computing device for the first computing device using the fault condition.

16. The system of claim 1, comprising an application on the first computing device to:

transmit, via the communication session, the request for service identifying context information associated with a user of the first computing device; and receive, via the communication session, the response data identifying one or more tasks for the user to perform as identified by the second computing device using the context information.

17. The system of claim 1, comprising an application on the first computing device to:

present, via a display, a prompt for initiation of the request for service of a smart TV device corresponding to the first computing device; and transmit, responsive to interaction with the prompt, the request for service to the data processing system.

18. A method of establishing communication sessions, comprising:

establishing, by a data processing system in a cloud environment communicatively coupled with first computing device and a second computing device in a contact center environment, using registration information of the first computing device, a communication session between the data processing system and the first computing device;

receiving, by the data processing system, from the first computing device via the communication session, a request for service identifying event information and a fault condition on the first computing device;

extending, by the data processing system, responsive to receiving the request for service, the communication session with the first computing device over the cloud environment in which the data processing system is in, to the second computing device in the contact center environment;

transmitting, by the data processing system, the request for service from the first computing device to the second computing device in the contact center environment via the communication session; and communicating, by the data processing system, via the communication session, response data identifying diagnostic information generated by the second computing device for the first computing device using the event information and the fault condition of the request for service.

19. The method of claim 18, comprising:

the first computing device including at least one of a set top box, a media device, or a smart TV.

20. The method of claim 18, comprising:

the first computing device including audio input, audio output, video input, and video output capability.

21. The method of claim 18, comprising:

providing, by the data processing system, to a mobile device associated with the first computing device, at least a portion of the response data from the communication session, responsive to establishment of a second communication session established between the mobile device and the second computing device in the contact center environment.

22. The method of claim 18, comprising:

providing, by the data processing system, to a second communication session between a mobile device and the second computing device in the contact center environment, at least a portion of the response data from the communication session, responsive to an indication to transfer the request for service from the first computing device to the mobile device.

* * * * *